(12) United States Patent
Batinica et al.

(10) Patent No.: US 10,911,705 B2
(45) Date of Patent: Feb. 2, 2021

(54) DIGITAL IN-PIXEL READ-OUT INTEGRATED CIRCUIT INCLUDING RESIDUE-TO-COUNTER CALIBRATION

(71) Applicant: RAYTHEON COMPANY, Waltham, MA (US)

(72) Inventors: Michael J. Batinica, Oro Valley, AZ (US); Elina R. Glaretas, Santa Barbara, CA (US); Micky Harris, Lompoc, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 16/427,968

(22) Filed: May 31, 2019

(65) Prior Publication Data
US 2020/0382733 A1    Dec. 3, 2020

(51) Int. Cl.
*H04N 5/3745* (2011.01)
*H04N 5/353* (2011.01)
*H04N 5/378* (2011.01)

(52) U.S. Cl.
CPC ........... *H04N 5/3745* (2013.01); *H04N 5/353* (2013.01); *H04N 5/378* (2013.01)

(58) Field of Classification Search
None
See application file for complete search history.

(56) References Cited

U.S. PATENT DOCUMENTS

| | | | |
|---|---|---|---|
| 9,615,047 B1* | 4/2017 | Palik | H04N 5/37455 |
| 9,674,471 B1 | 6/2017 | Boemler | |
| 2009/0322912 A1* | 12/2009 | Blanquart | H04N 5/2351 348/241 |
| 2010/0226495 A1* | 9/2010 | Kelly | H04N 5/378 380/30 |
| 2013/0278804 A1 | 10/2013 | Denham et al. | |
| 2014/0008521 A1* | 1/2014 | Rostaing | H04N 5/35536 250/208.1 |
| 2015/0326805 A1* | 11/2015 | Scott | H04N 5/378 348/243 |

OTHER PUBLICATIONS

International Search Report and Written Opinion for International Application No. PCT/US2020/033517; Application Filing Date May 19, 2020; dated Jul. 29, 2020 (14 pages).

* cited by examiner

*Primary Examiner* — Twyler L Haskins
*Assistant Examiner* — Wesley J Chiu
(74) *Attorney, Agent, or Firm* — Cantor Colburn LLP (57) ABSTRACT

A digital pixel circuit includes a unit cell configured to accumulate an electrical charge during a frame. The electrical charge is proportional to a light intensity of a light signal that is detected at a location in a field of view of the unit cell. An image processing unit is in signal communication with the unit cell. The image processing unit is configured to determine a total charge based on a plurality of accumulated charges over a plurality of sequential frames, and to determine an indication of the light intensity of light at the location based on the total charge. The unit cell is configured to operate in a first mode to accumulate the electrical charges over the plurality of sequential frames, and a second mode to perform a calibration operation that calibrates the unit cell based on the electrical charge accumulated during a single frame among the plurality of frames.

13 Claims, 8 Drawing Sheets

DIGITAL IN-PIXEL READ-OUT INTEGRATED CIRCUIT INCLUDING RESIDUE-TO-COUNTER CALIBRATION

BACKGROUND

The present disclosure relates to digital counter circuits and methods of operating a digital counter circuit and, in particular, a method and apparatus for determining a voltage level output from the digital counter circuit.

Traditional digital in-pixel read-out integrated circuits (DROICs) include an analog-to-digital converter (ADC) to convert the residual or remaining accumulated charge stored in an integration capacitor (sometimes referred to as a well capacitor) into a digital signal representing a binary value. This DROIC architecture offers improved photo-charge capacity even as the desired size of unit cells continues to shrink. A traditional DROIC design includes a quantizing analog front end circuit which accumulates charge on the integration capacitor and is reset (i.e., discharged) each time the charge on the integration capacitor reaches a charge threshold. The pattern of charging (i.e., the trigger) and then resetting is repeated as the photo-current integrates. Each trigger event is recorded, i.e., "counted", using a digital counter circuit. Upon completion of each frame, a snapshot is taken by copying the digital counter contents to a snapshot register and the residual charge remaining on the integration capacitor is measured by an ADC. The total charge accumulated in the DROIC is then determined based on the recorded counts and any residual voltage stored on the integration capacitor. The effect is to exponentially increase charge capacity while maintaining low signal capability with a relatively small unit pixel cell size.

SUMMARY

According to a non-limiting embodiment of the present disclosure, a digital pixel circuit includes a unit cell configured to accumulate an electrical charge during a frame. The electrical charge is proportional to a light intensity of a light signal that is detected at a location in a field of view of the unit cell. An image processing unit is in signal communication with the unit cell. The image processing unit is configured to determine a total charge based on a plurality of accumulated charges over a plurality of sequential frames, and to determine an indication of the light intensity of light at the location based on the total charge. The unit cell is configured to operate in a first mode to accumulate the electrical charges over the plurality of sequential frames, and a second mode to perform a calibration operation that calibrates the unit cell based on the electrical charge accumulated during a single frame among the plurality of frames.

According to another non-limiting embodiment of the present disclosure, a unit cell included in a digital pixel circuit comprises an image detector that includes a light sensor configured to detect a light signal and an energy storage device configured to accumulate an electrical charge during a frame. A digital readout integrated circuit (DROIC) including a disable circuit is in signal communication with the image detector. The disable circuit is configured to selectively invoke a first mode configured to determine a total electrical charge of the DROIC based on a plurality of accumulated electrical charge obtained over a plurality of frames, and a second mode configured to calibrate the DROIC based on an accumulated charge obtained during a single frame among the plurality of frames.

According to another non-limiting embodiment of the present disclosure, a method is provided to calibrate a digital in-pixel read-out integrated circuit (DROIC). The method comprises accumulating an electrical charge, via a unit cell, during a frame, the electrical charge being proportional to a light intensity of a light signal that is detected at a location in a field of view of the unit cell. The method further comprises determining, via an image processing unit in signal communication with the unit cell, a total charge based on a plurality of accumulated charges over a plurality of sequential frames, and invoking a first mode of the unit cell to accumulate the plurality of electrical charges over the plurality of sequential frames. The method further comprises invoking a second mode of the unit cell to perform a calibration operation that calibrates the unit cell based on the electrical charge accumulated during a single frame among the plurality of frames.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

The subject matter which is regarded as the disclosure is particularly pointed out and distinctly claimed in the claims at the conclusion of the specification. The forgoing and other features, and advantages of the disclosure are apparent from the following detailed description taken in conjunction with the accompanying drawings in which:

DETAILED DESCRIPTION

Figure 5:
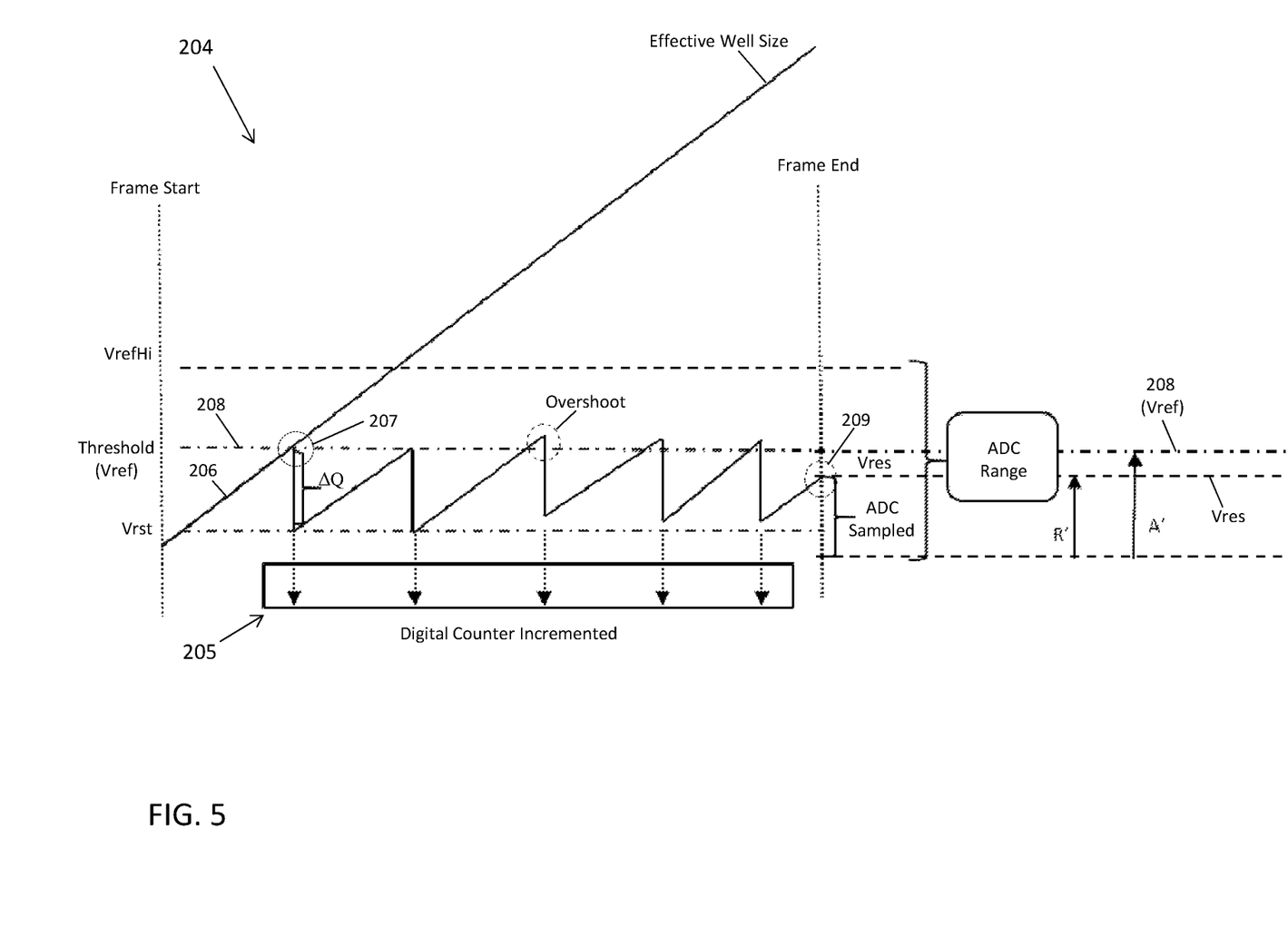
FIG. 5 is a graph illustrating a signal trace representing voltage across the integration capacitor of the detector included in the digital pixel circuit shown in FIG. 4 according to a non-limiting embodiment.
Figure 7:
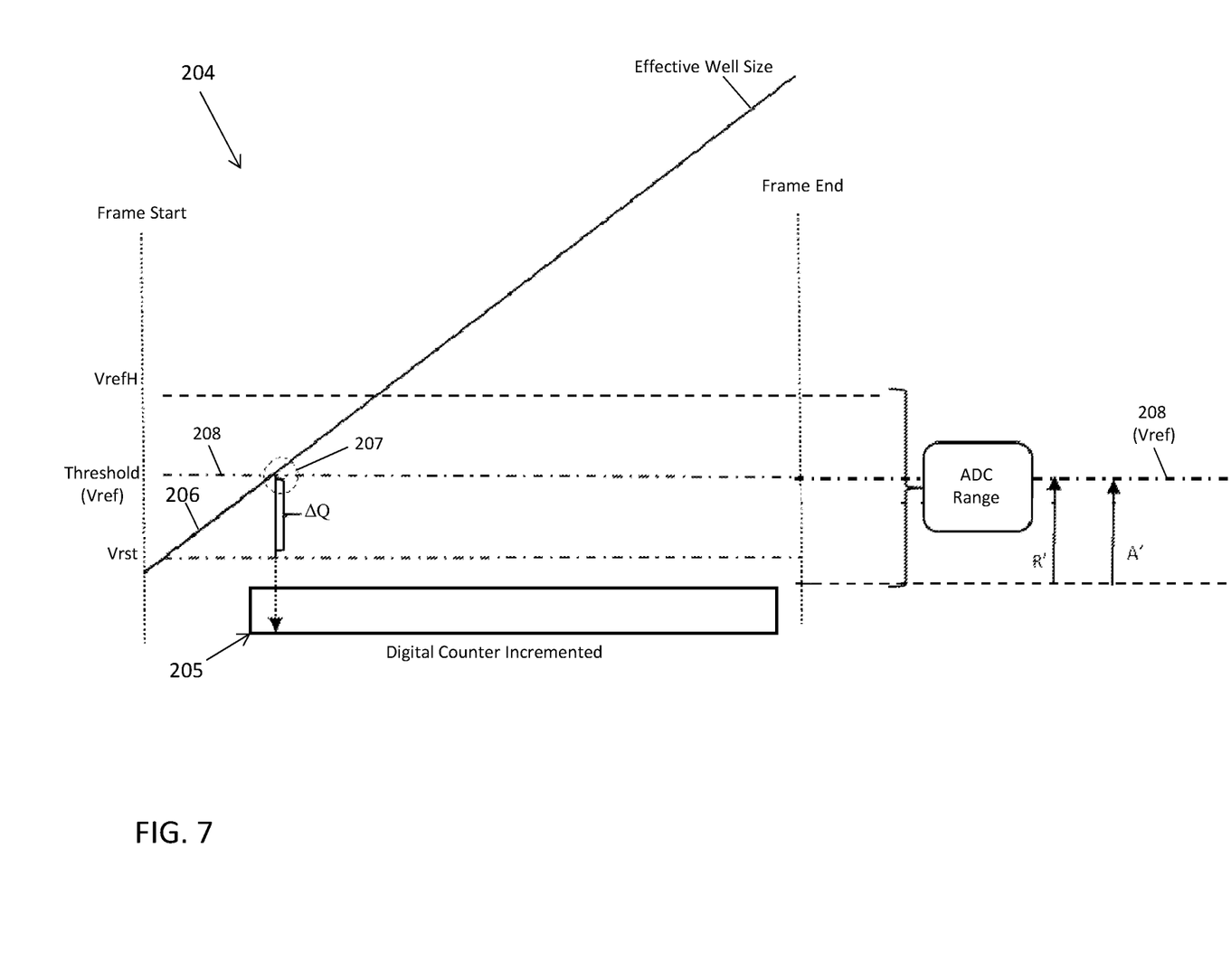
FIG. 7 a graph illustrating a signal trace representing voltage across the integration capacitor when invoking a calibration mode of a DROIC according to a non-limiting embodiment.

The DROIC needs a calibration method for each pixel to align the digital counter with the ADC at the point where the digital counter is incremented. Referring to FIG. 5, the threshold for a digital count event is set by the reference voltage (Vref) for that given pixel and must be determined to maintain the linearity as shown in FIG. 7 at higher signal levels. The complexity of calibrating each pixel is lengthy and requires finding the threshold at which the point the digital counter is triggered at least once. The proposed technique is achieved using a single frame of video thereby allowing the counter to trigger only once and disallowing any more charge accumulation on the integration capacitor, and at the end of the frame time use the ADC to sample the charge on the integration capacitor which triggered the counter event.

During operation, the DROIC aims to measure the residual charge at the end of a frame period on the integration capacitor using the ADC. According to a first non-limiting embodiment shown in FIG. 5, the repeated charging and resetting of the integration capacitor may result in one or more overshoot events during which the integration capacitor briefly charges above the charge threshold and an exact quanta of charge is subtracted from the integration capacitor.

Figure 8:
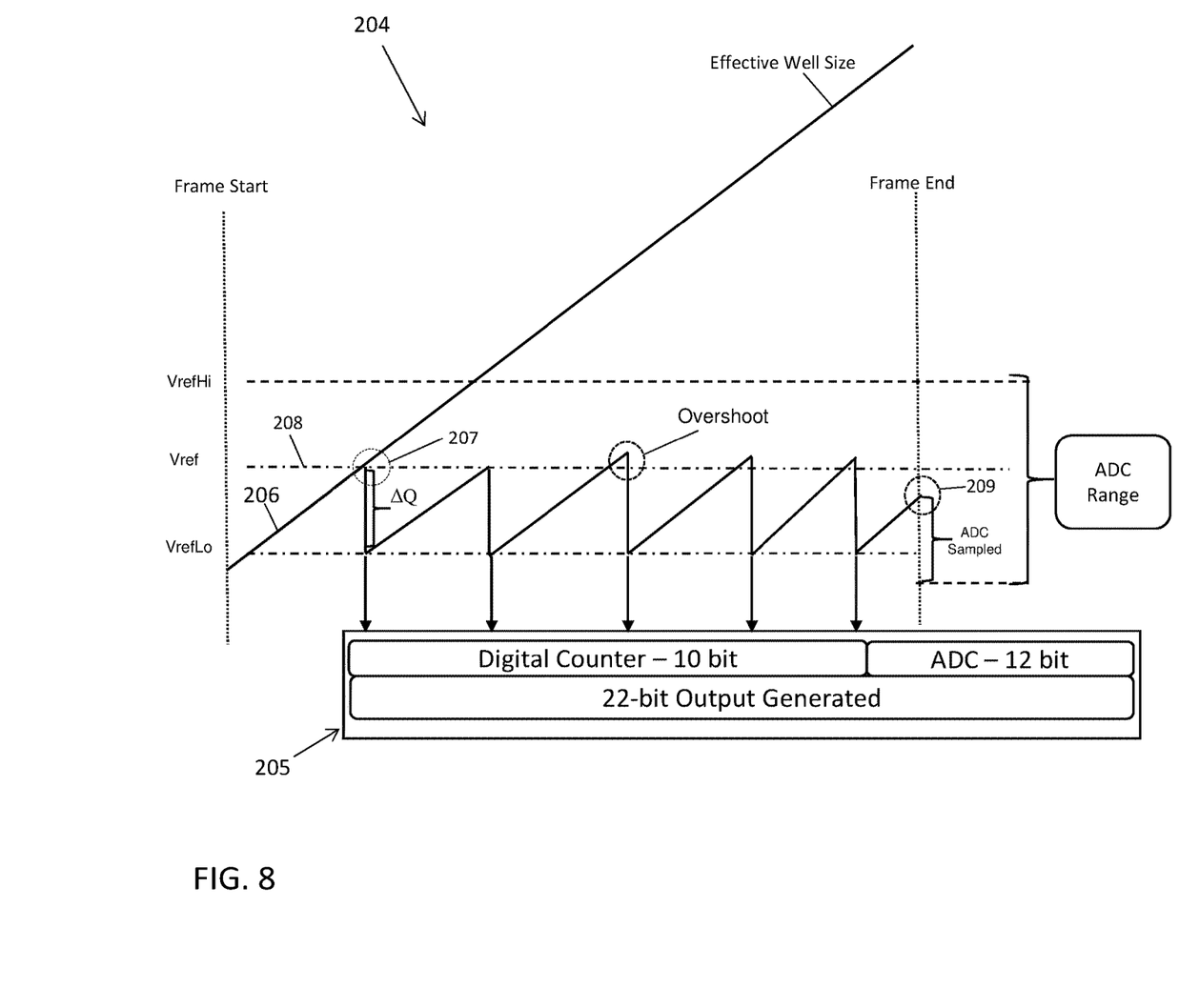
FIG. 8 is a graph illustrating a signal trace representing voltage across the integration capacitor of the detector included in the digital pixel circuit shown in FIG. 4 according to another non-limiting embodiment.

According to a second non-limiting embodiment shown in FIG. 8, the DROIC always resets to the same reference. For example, the signal charges integration capacitor (Cint), and the comparator triggers a reset based on the voltage charge of the capacitor, i.e., Cint (Q=CV). In response to the trigger event, the digital counter is incremented and the charge is dumped from the integration capacitor (Cint). The operation is repeated until the end of the frame, while the ADC samples the remaining charge of the integration capacitor (Cint).

In either architecture described above, the overshoot events are signal and sampling rate dependent resulting in increased temporal noise.

To compensate for the aforementioned residue phenomena, a calibration is necessary between the residue and the counter. However, calibration of the DROIC is proven difficult and challenging using conventional calibration techniques. One known calibration technique, for example, attempts to calibrate the DROIC based on a comparator and comparator threshold. This technique, however, requires a controlled environment so that the integration time can be adjusted to capture a residual value prior to triggering the counter. Another known technique aims to adjust the flux level with a fixed integration time to determine the point where the non-linear response meets the flux. However, this technique is extremely time consuming and also requires a controlled environment.

Various non-limiting embodiments described herein provide a DROIC circuit, which includes a disable circuit capable of invoking a calibration mode to dynamically determine the output of the ADC at the time the counter is triggered (i.e., at the integration capacitor charge threshold). The calibration technique described herein takes advantage of the fact the ADC dynamic range contains the charge threshold at which the counter triggers, and uses the time at which the counter triggers (i.e., the charge threshold) as a voltage reference (Vref) used for the calibration. The calibration mode facilies the calibration technique by preventing the immediate reset of the integration capacitor and allowing utilization of the ADC output to measure the current charge in in response to triggering the counter. In other words, the disable circuit prevents the immediate reset of the integration capacitor, thereby allowing the integration capacitor to hold its charge until the end of the frame period. Accordingly, a more precise measurement of the charge on the integration capacitor can be obtained by analyzing the output of the ADC at the end of the frame time. Thus, a relationship is established between the residue and the counter trigger time (i.e., Vref) which provides the DROIC calibration.

Figure 1:
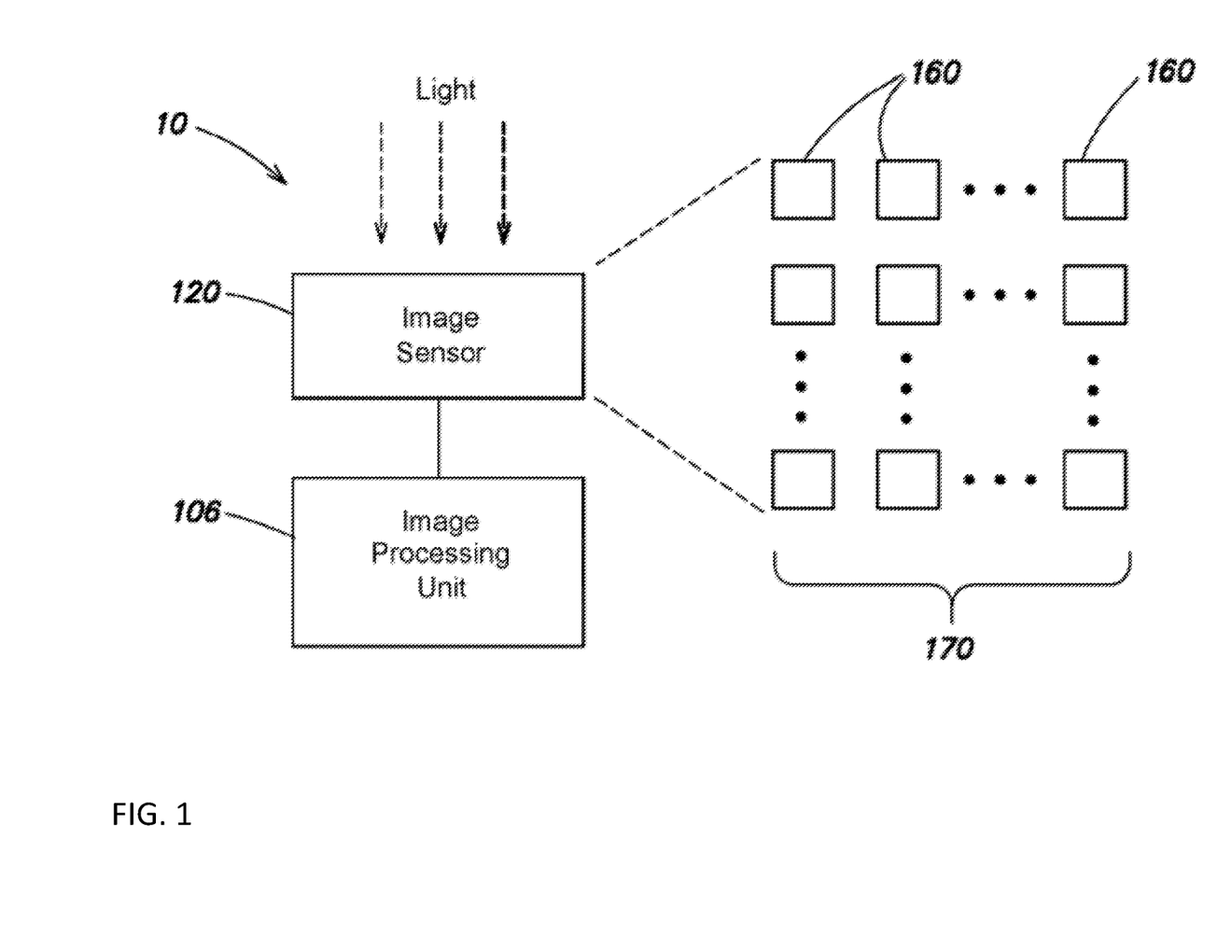
FIG. 1 is a block diagram illustrating an image capture device that may be used to capture images according to aspects described herein.

Turning now to FIG. 1, a block diagram illustrating an image capture device 10 that may be used to capture images according to aspects described herein. For example device 10 may be a digital camera, video camera, or other photographic and/or image capturing equipment. Image capture device 10 comprises an image sensor 120 and an image processing unit 106. The image sensor 120 may be an Active Pixel Sensor (APS) or other suitable light sensing device that can capture images. The image processing unit 106 may be a combination of hardware, software, and/or firmware that is operable to receive signal information from the image sensor 120 and convert the signal information into a digital image.

The image sensor 120 includes an array 170 of unit cells 160. Each unit cell 160 accumulates charge proportional to the light intensity at that location in the field of view and provides an indication of the intensity of light at that location to the image processing unit 106. Each unit cell 160 may correspond to a pixel in the captured electronic image.

A particular method for image capture using image capture device 10 is referred to as ripple read. Ripple read is a method that processes each row of unit cells from image sensor 120 in order. Ripple read may process the top row of unit cells of image sensor 120, followed by the second row, followed by the third row, and so forth until the last row of unit cells of image sensor 120 is processed. A ripple reset operation to reset the rows of unit cells of image sensor 120 may be performed similarly.

These methods may be performed on consecutive rows. For example, a ripple capture operation may begin with the first row of image sensor 120. As the ripple capture operation moves to the second row, a ripple read operation may begin on the first row of image sensor 120. After the ripple capture operation moves to the third row, the ripple read operation may begin on the second row and a ripple reset operation may begin on the first row. This may continue until the last row is processed. Once the last row is processed, the image may be processed, stored, and/or transmitted by the image processing unit 106.

Figure 2:
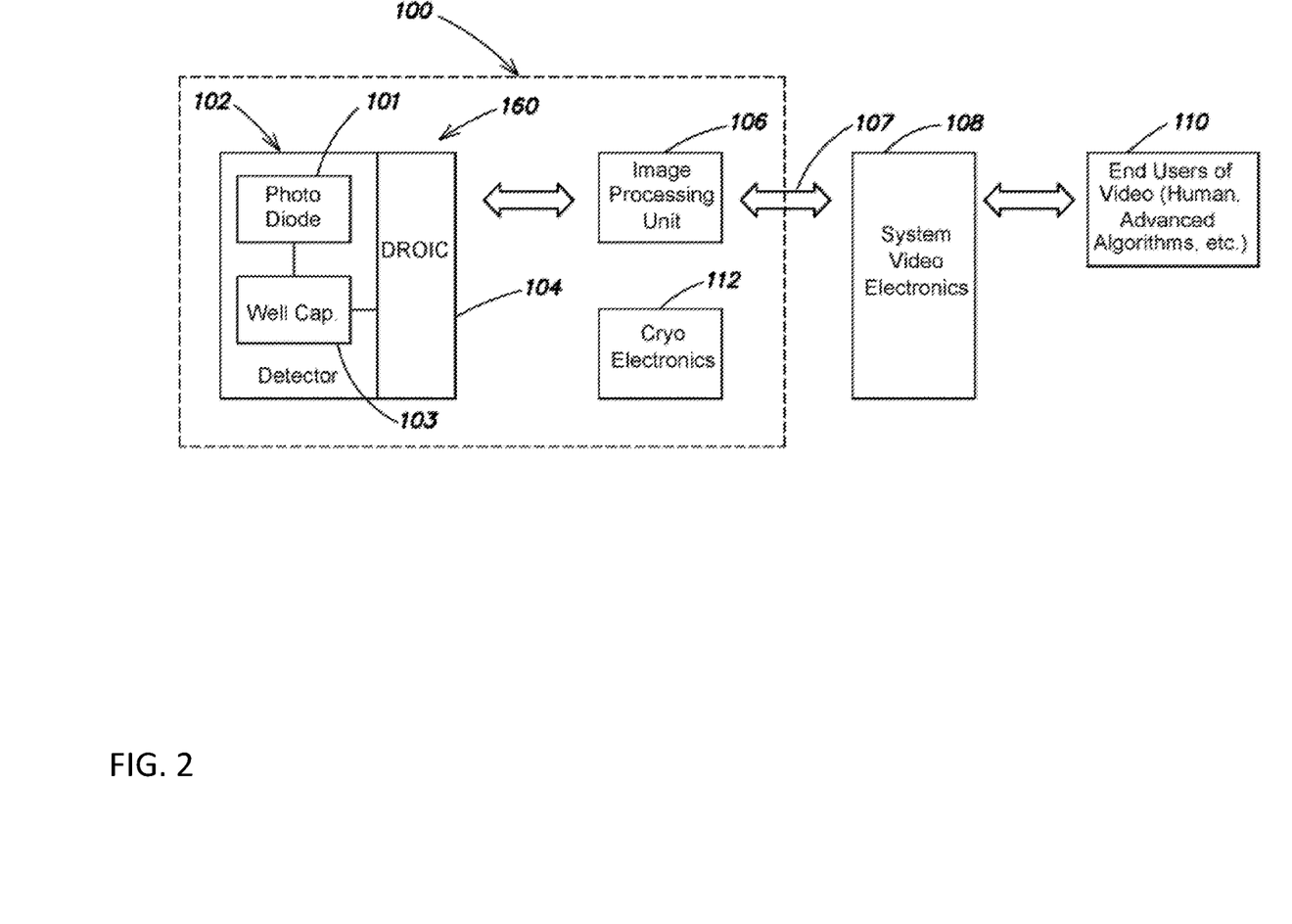
FIG. 2 is a block diagram illustrating a digital unit cell including a DROIC according to aspects described herein.

Turning to FIG. 2, a block diagram illustrating a digital pixel circuit 100 according to aspects described herein. The digital pixel circuit 100 includes one of the unit cells 160 and the image processing unit 106. The unit cell 160 includes an image detector 102 and a DROIC 104.

The image detector 102 includes a light sensor 101, an energy storage device 103 coupled to the light sensor 101, and other components, as discussed above. The image detector 102 is coupled to a corresponding DROIC 104. The energy storage device 103 includes, for example, an integration capacitor 103, and the light sensor 101 includes, for example, a photodiode 101. The DROIC 104 is coupled to the image processing unit 106. Although the DROIC 104 and the imaging processing unit 106 are shown as separate components, it should be appreciated that other embodiments allow for a DROIC 104 that can perform the functions of the image processing unit 106 described above.

The image processing unit 106 is coupled to an external system video electronics module 108 via an interface 107. According to at least one embodiment, the digital pixel circuit 100 also includes a cryo-electronics module 112 that is configured to control the temperature of the DROIC 104. In other embodiments, however, the cryo-electronics module 112 may not be included.

Figure 3:
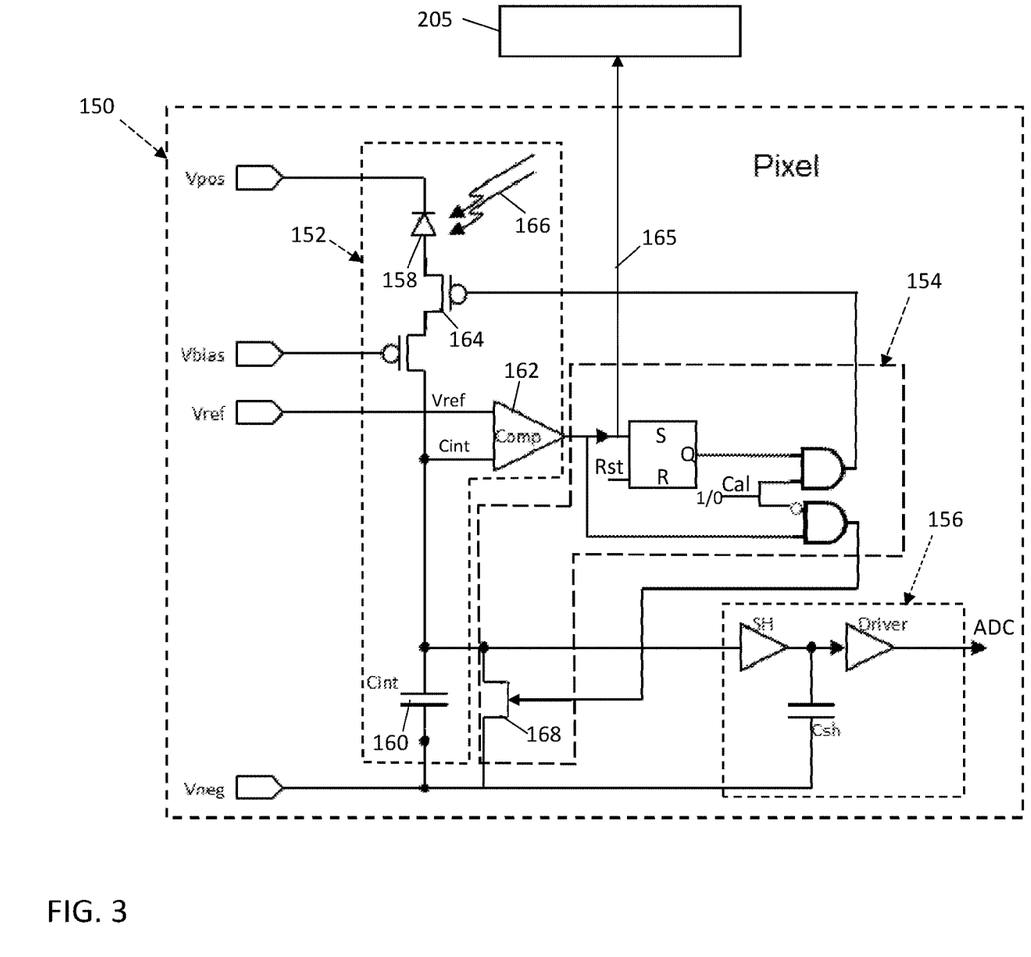
FIG. 3 is a schematic diagram of a DROIC pixel including a disable circuit configured to invoke the calibration mode of the DROIC according to a non-limiting embodiment.

Turning now to FIG. 3, a schematic diagram of a DROIC unit cell 150 (referred to herein as a DROIC pixel) is illustrated according to a non-limiting embodiment. The DROIC pixel 150 includes a detector circuit 152, a disable circuit 154, and a sample and hold (SH) circuit 156. The detector circuit 152 includes a photodiode 158, an integration capacitor 160, a comparator 162, and a deactivation transistor 164. The photodiode 158 is configured to detect a light signal 166 (e.g., light photons 166), and the integration capacitor 160 is configured to store an electrical charge induced in response to the impinging light signal 166 (e.g., light photons 166) upon the photodiode 158.

The disable circuit 154 is configured to invoke a normal mode and a calibration mode of the DROIC pixel 150. When the disable circuit 154 is invoked in the normal mode (e.g., a "0" bit signal is applied to the calibration mode input (Cal)), the photodiode 158 accumulates an electric charge that is proportional to the intensity of the received light photons 166. As charge accumulates on the photodiode 158, the voltage across the integration capacitor 160 increases until reaching a charge threshold (Vref). In response to reaching the charge threshold (Vref), a counter trigger event occurs and the integrating capacitor 160 is discharged (the accumulated charge is dumped) effectively resetting the integrating capacitor 160. In turn, the voltage on the Cint terminal of the comparator 162 drops below a voltage reference (Vref), thereby changing the value of the comparator output. The changed output is recorded as a reset event 165 by the reset counter 205. The integration capacitor 160 again charges and the process described above is repeated until the last frame is completed.

When the disable circuit 154 is invoked in the calibration mode (e.g., a "1" bit signal is applied to the calibration mode input (Cal)), the detector circuit 152 is disconnected via the deactivation transistor 164, while the reset disabling transistor 168 is switched on. The reset disabling transistor 168 is connected in parallel with the integration capacitor 160. Accordingly, switching on the reset disabling transistor 168 maintains a bias voltage (Vbias) across the integrating capacitor 160 rather than allowing the integrating capacitor 160 to reset and dump its accumulated charge. The SH circuit 156 is then able to output the existent charge on the integrating capacitor 160 to an ADC, which can then obtain a more precise measurement of the accumulated charge. Once the ADC measurement is obtained, the disable circuit 154 can be transitioned back into the normal mode and the process described above can be repeated.

Figure 4:
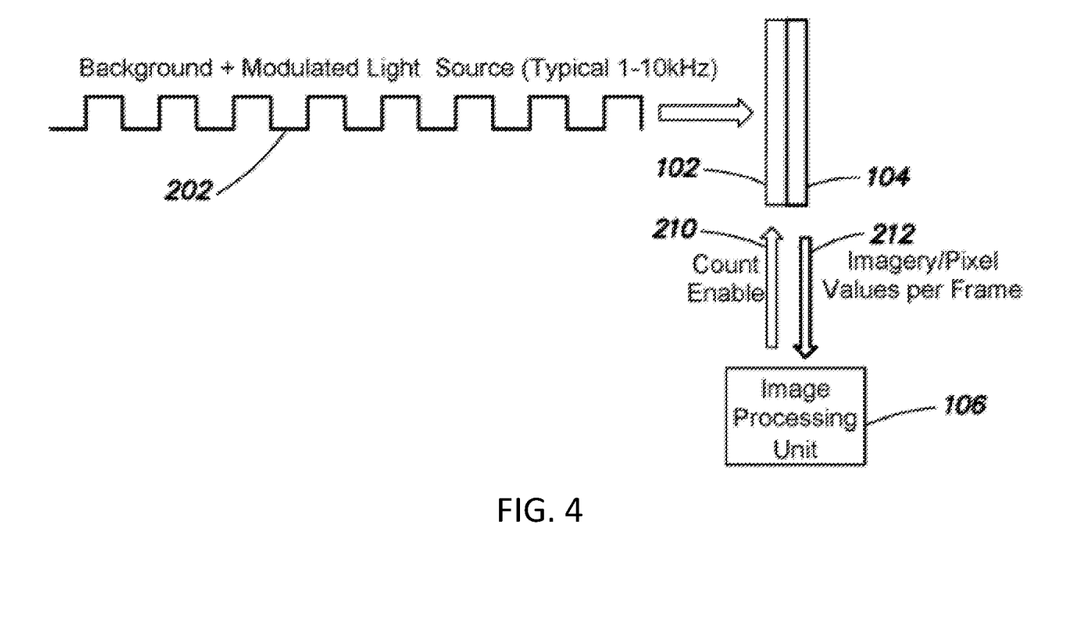
FIG. 4 is a block diagram illustrating operation of the digital pixel circuit with respect to an input light signal incident on the detector according to a non-limiting embodiment.
Figure 6:
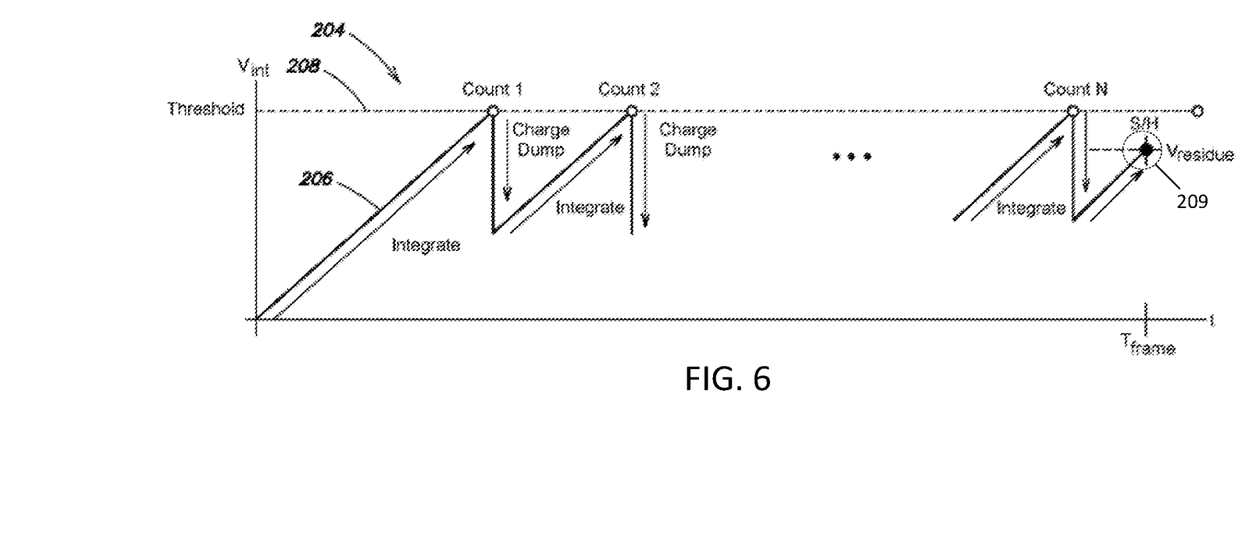
FIG. 6 is a close-up view of the graph illustrated in FIG. 5 according to a non-limiting embodiment.

FIG. 4 is a block diagram illustrating operation of the digital pixel circuit 100 with respect to an input light signal 202 (including background and modulated light) incident on the detector 102, a count enable signal 210 transmitted from the image processing unit 106 to the DROIC 104, and DROIC 104 total reset count values 212. FIGS. 5 and 6 are graphs 204 illustrating a trace 206 representing voltage across the integration capacitor 103 of the detector 102 as the input light signal 202 is incident on the detector 102.

The detector 102 is arranged to receive light from a desired scene. The light received from the scene may include background light from the scene and/or pulsed light from a modulated light source in the scene. The background and modulated light from the scene are received by the detector 102 as an input light signal 202 including both the background and the modulated (i.e., pulsed) light. In one embodiment, the input light signal 202 has a frequency of 1-10 kHz; however, in other embodiments, the input light signal 202 may have different characteristics. As the input light signal 202 (including background and modulated light) is incident on the detector 102 (e.g., via a lens adjacent the detector 102), the detector 102 accumulates an electric charge (e.g. generated by its photodiode 101 and stored in its integration capacitor 103) proportional to the intensity of the light incident on the detector 102. As charge accumulates on the detector 102 (i.e., on the integration capacitor 103 of the detector 102), the voltage 206 across the integration capacitor 103 increases (e.g., as shown in the graphs 204 of FIGS. 5 and 6) until reaching the charge threshold (Vref). In response to reaching the charge threshold (Vref), a counter trigger event 207 occurs and the integration capacitor 103 is discharged (the accumulated charge is dumped) such that the voltage 206 drops (e.g., returns to Vrst).

When the detector 102 begins to integrate the input light signal 202, the image processing unit 106 transmits a high count enable signal 210 to the DROIC 104. The high count enable signal 210 activates an integration reset counting feature of the DROIC 104 (see FIGS. 5 and 6). More specifically, when the count enable signal 210 is high, the DROIC 104 actively counts reset events of the detector 102. For example, as shown in graphs 204 of FIGS. 5 and 6, when the voltage 206 across the integration capacitor 103 reaches a predefined integration threshold (Vref) 208 and the count enable signal 210 is high, the detector 102 discharges the capacitor and the DROIC 104 increments a reset counter 205. Assuming light is still incident on the detector 102, the detector 102 again accumulates charge. When the voltage 206 across the integration capacitor 103 again reaches the predefined integration threshold 208 and the count enable signal 210 is still high, the detector 102 discharges the integration capacitor 103 and the DROIC 104 again increments the reset counter 205. As shown in the graphs 204 of FIGS. 5 and 6, this cycle may continue until the entire input light signal 202 has been integrated, i.e., from the frame start to the frame end. According to one non-limiting embodiment, the DROIC 104 increments the reset counter 205 at a rate of at least 100 kHz. In other embodiments, however, the DROIC 104 can increment the reset counter 205 at some other frequency. Following completion of the integrated signals, a voltage residue 209 is present which has a value that falls in between Vref and Vrst.

The image processing unit 106 monitors the rate at which the DROIC 104 increments the reset counter 205 (i.e., the count rate of the DROIC 104). If the count rate of the DROIC 104 does not exceed a count rate threshold, the image processing unit 106 maintains the count enable signal 210 in a high state. When the count enable signal 210 is maintained at a high state, the DROIC 104 actively counts reset events (i.e., increments the reset counter 205) of the detector 102. If the count rate of the DROIC 104 exceeds the count rate threshold, the image processing unit 106 transmits a low count enable signal 210 to the DROIC 014. The low count enable signal 210 deactivates the integration reset counting feature of the DROIC 104. More specifically, when the count enable signal 210 is low, the DROIC 104 ignores (i.e., does not count) reset events of the detector 102. For example, when the voltage 206 across the integration capacitor 103 reaches a predefined integration threshold 208 and the count enable signal 210 is low, the detector 102 discharges the capacitor 103, but the DROIC 104 does not increment the reset counter 205. When the count rate of the DROIC 104 again drops below the count rate threshold, the image processing unit 106 again transmits a high count enable signal 210 to the DROIC 104 and the DROIC 104 again counts reset events of the detector 102.

Periodically (e.g., once per frame), the image processing unit 106 retrieves the value 212 of the DROIC's 104 reset counter 205 (i.e., the number of times that the DROIC 104 has counted a reset event of the detector 102). As shown in FIG. 2, the image processing unit 106 is coupled to the single DROIC 104 (of the single unit cell 160). However, where the image processing unit 106 is coupled to each unit cell 160 in the array 170 of unit cells 160 (i.e., to the DROIC 104 and corresponding detector 102 of each unit cell 160), the image processing unit 106 is configured to periodically retrieve reset counter values from each DROIC 104 in the array 170. The image processing unit 106 processes the retrieved reset counter values from each DROIC 104 in the array 170 to generate image information (e.g., a digital image) based on the reset counter value(s). The image processing unit 106 may transmit the image information to an external system video electronics module 108. The external system video electronics module 108 may further process the image information and/or transmit the image information to an end user 110. The end user may be an individual user or a system that is configured to analyze and/or further process the image information (e.g., via advanced algorithms).

FIG. 7 is a graph 204 illustrating a signal trace 206 representing voltage across the integration capacitor 103 when invoking a calibration mode of a DROIC 104 according to a non-limiting embodiment. As shown in FIG. 7, a counter trigger event 207 occurs in response to the voltage 206 reaching the charge threshold (VRef). In response to triggering the counter 205, the detector 102 is disconnected. Accordingly, although the counter 205 has effectively been triggered, the integration capacitor 103 is not "reset" and instead maintains its charge. The charge on the integration capacitor 103 can be defined as ΔQ, i.e., the difference between the charge threshold (Vref) of the integration capacitor 103 and the reset voltage (Vrst), e.g., the capacitor's minimum voltage capacity. Once the frame completes, the output of the ADC is obtained which indicates the existent charge on the integration capacitor 103. Because the integration capacitor 103 is prevented from being reset, the ADC output measures the existent charge on the capacitor 103, as opposed to the voltage residue 209 that may be measured during the normal operating mode (see FIGS. 5 and 6). By preventing occurrence of the residue 209, the ADC obtains a more precise measurement of the charge on the integration capacitor 103. In effect, the "residue" output (R') would be viewed as being equal to the actual measured ADC output (A') indicative of the existent charge on the integration capacitor, thereby achieving a proper calibration.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for exemplary embodiments with various modifications as are suited to the particular use contemplated.

While the exemplary embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A digital pixel circuit comprising:
   a unit cell configured to accumulate an electrical charge during a frame, the electrical charge being proportional to a light intensity of a light signal that is detected at a location in a field of view of the unit cell, wherein the unit cell comprises:
     an image detector that includes a light sensor configured to detect the light signal and an energy storage device configured to accumulate the electrical charge; and
     a digital readout integrated circuit (DROIC) including a disable circuit in signal communication with the image detector; and
   an image processing unit in signal communication with the unit cell, the image processing unit configured to determine a total charge based on a plurality of accumulated charges, and to determine an indication of the light intensity of light at the location based on the total charge,
   wherein the unit cell is configured to operate in a first mode to accumulate the electrical charges, and to operate in a second mode to perform a calibration operation that calibrates the unit cell based on the electrical charge accumulated,
   wherein the disable circuit includes a switch connected in parallel with the energy storage device and configured to selectively invoke the first mode and the second mode, and wherein the switch is activated in response to invoking the second mode such that the switch delivers a bias voltage across the energy storage device to prevent the energy storage device from discharging.

2. The digital pixel circuit of claim 1, wherein the calibration operation is performed prior to completing a final frame.

3. The digital pixel circuit of claim 1, wherein the disable circuit is configured to connect the light sensor to the energy storage device in response to invoking the first mode, and to disconnect the light sensor from the energy storage device in response to invoking the second mode.

4. The digital pixel circuit of claim 3, wherein the disable circuit is further configured to allow the energy storage device to discharge in response to the electrical charge reaching a charge threshold level while operating in the first mode, and wherein the disable circuit is configured to prevent the energy storage device from discharging while operating in the second mode.

5. The digital pixel circuit of claim 4, wherein the image sensor is a photodiode, and the energy storage device is a capacitor.

6. The digital pixel circuit of claim 1, wherein the switch is deactivated in response to invoking the first mode such that the switch disconnects the bias voltage across the energy storage device to allow the energy storage device to discharge in response to reaching the charge threshold level.

7. A unit cell included in a digital pixel circuit, the unit cell comprising:
   an image detector that includes a light sensor configured to detect a light signal and an energy storage device configured to accumulate an electrical charge during a frame; and
   a digital readout integrated circuit (DROIC) including a disable circuit in signal communication with the image detector, the disable circuit configured to selectively invoke a first mode configured to determine a total electrical charge of the DROIC based on a plurality of accumulated electrical charges, and a second mode configured to calibrate the DROIC based on an accumulated charge,
   wherein the disable circuit includes a switch connected in parallel with the energy storage device, and wherein the switch is activated in response to invoking the second mode such that the switch delivers a bias voltage across the energy storage device to prevent the energy storage device from discharging.

8. The unit cell of claim 7, wherein the disable circuit is configured to connect the light sensor to the energy storage device in response to invoking the first mode, and to disconnect the light sensor from the energy storage device in response to invoking the second mode.

9. The unit cell of claim 8, wherein the disable circuit is further configured to allow the energy storage device to discharge in response to the electrical charge reaching a charge threshold level while operating in the first mode, and wherein the disable circuit is configured to prevent the energy storage device from discharging while operating in the second mode.

10. The unit cell of claim 9, wherein the image sensor is a photodiode, and the energy storage device is a capacitor.

11. The unit cell of claim 7, wherein the switch is deactivated in response to invoking the first mode such that the switch disconnects the bias voltage across the energy storage device to allow the energy storage device to discharge in response to reaching the charge threshold level.

12. A method of operating a unit cell included in a digital pixel circuit, the method comprising:
   accumulating an electrical charge, via a unit cell, during a frame, the electrical charge being proportional to a light intensity of a light signal that is detected at a location in a field of view of the unit cell; and
   determining, via an image processing unit in signal communication with the unit cell, a total charge based on a plurality of accumulated charges;
   invoking a first mode of the unit cell to accumulate the plurality of electrical charges;
   invoking a second mode of the unit cell to perform a calibration operation that calibrates the unit cell based on the electrical charge;
   connecting the light sensor to the energy storage device via a disable circuit in response to invoking the first mode; and
   disconnecting the light sensor from the energy storage device via the disable circuit in response to invoking the second mode,
   wherein the connecting and disconnecting includes:
   activating a switch in response to invoking the second mode to deliver a bias voltage across the energy storage device to prevent the discharging; and
   deactivating the switch in response to invoking the first mode to disconnect the bias voltage across the energy storage device to allow the discharge, and
   wherein the switch is connected in parallel with the energy storage device.

13. The method of claim 12, further comprising:
   allowing allow the energy storage device to discharge via the disable circuit in response to the electrical charge reaching a charge threshold level while operating in the first mode; and
   preventing the energy storage device from discharging via the disable circuit while operating in the second mode.

* * * * *